Dec. 8, 1931.   L. M. BOWMAN   1,835,138
INTERNAL COMBUSTION ENGINE
Filed Dec. 17, 1928   5 Sheets-Sheet 2

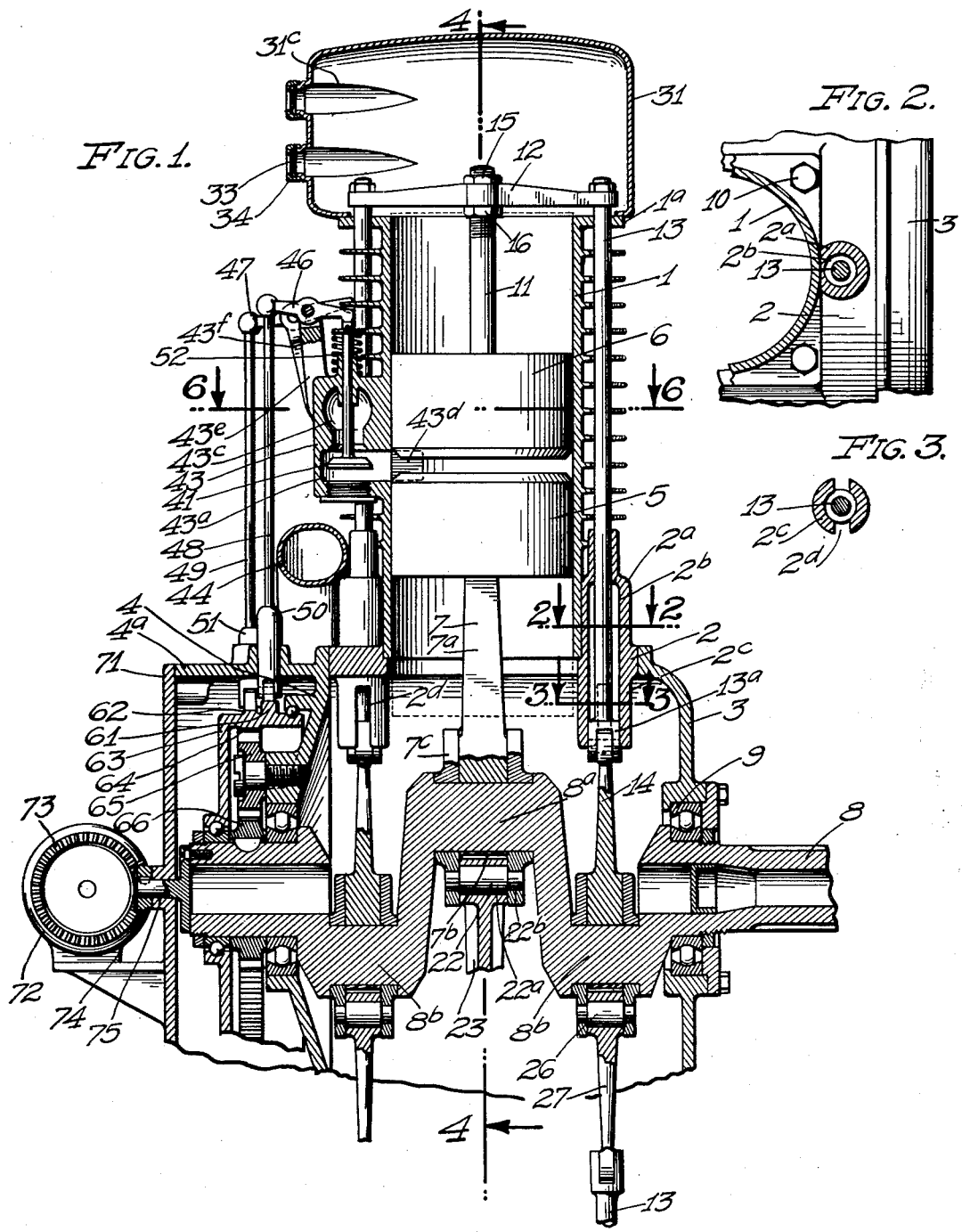

INVENTOR.
LEE M. BOWMAN.
BY A. B. Bowman
ATTORNEY

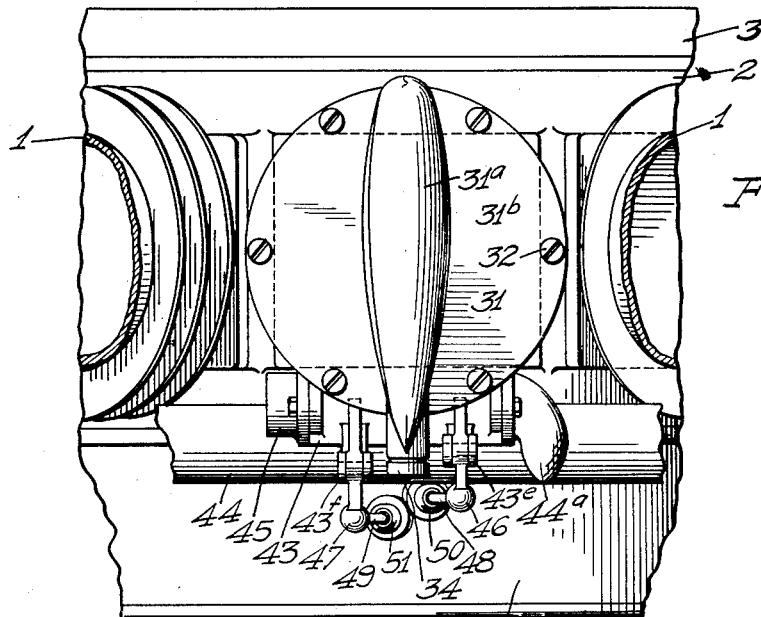
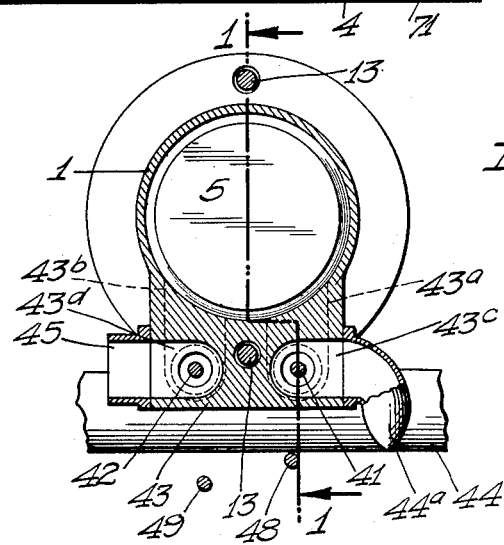

Dec. 8, 1931.  L. M. BOWMAN  1,835,138
INTERNAL COMBUSTION ENGINE
Filed Dec. 17, 1928   5 Sheets-Sheet 5

INVENTOR.
LEE M. BOWMAN.
BY A. B. Bowman
ATTORNEY

Patented Dec. 8, 1931

1,835,138

UNITED STATES PATENT OFFICE

LEE M. BOWMAN, OF LOS ANGELES, CALIFORNIA

INTERNAL-COMBUSTION ENGINE

Application filed December 17, 1928. Serial No. 326,439.

My present invention relates to internal combustion engines, particularly to though not limited to radial air craft engines.

The objects of this invention are: first, to provide an engine having oppositely reciprocating pistons whereby vibration, due to the reciprocation of reciprocating parts of the ordinary engine, is reduced to a minimum; second, to provide an engine of this class whereby the useful power is substantially doubled in proportion to its weight when compared with the present type engine; third, to provide an engine of this class which, although the useful power is materially increased, is not substantially increased in size; fourth, to provide an engine of this class whereby the strength of the cylinders and crank case may be considerably reduced since no radial outward force is applied to the cylinders, all power strokes and compression strokes being in opposite direction with equal force and resistance upon and by power elements; fifth, to provide an engine of this class in which there is double fuel capacity and in which there may be double recompression of the ordinary engine; sixth, to provide an engine of this class whereby the compression of the engine may be readily changed without removal of any of the operating parts; seventh, to provide novelly arranged intake and exhaust ports and valves for engines of this class; eighth, to provide novel valve cam and push rod operating means for operating the valves of the engine; ninth, to provide novel means of connecting the outer of a pair of oppositely reciprocating pistons to the crank shaft; tenth, to provide novel guide means for the connecting rods and other rods operatively connected to the outer pistons; eleventh, to provide novelly constructed connecting rods for internal combustion engines; and twelfth, to provide as a whole a novelly constructed internal combustion engine, one which is durable and highly efficient and which will not readily deteriorate or get out of order.

Figure 4:
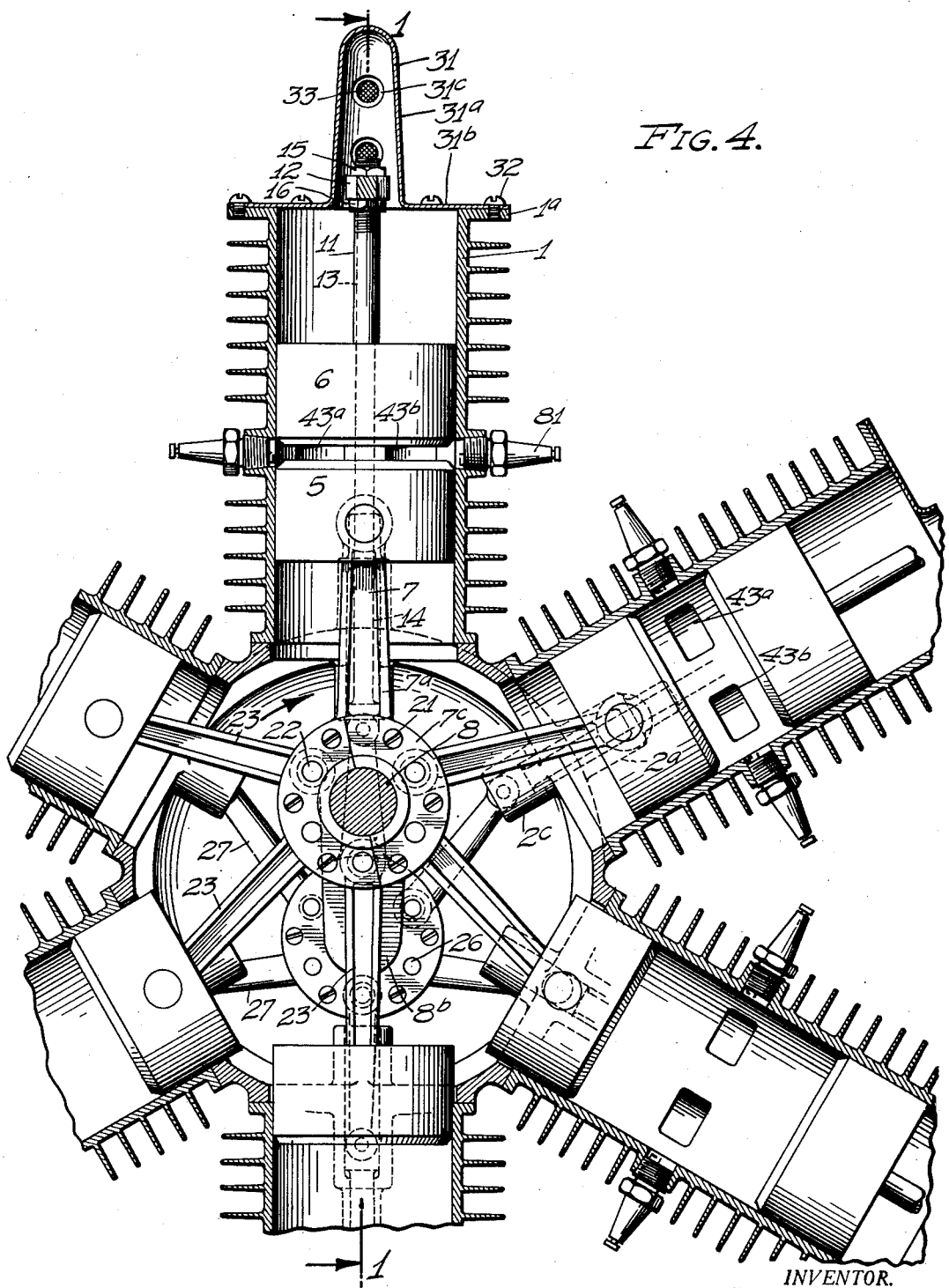
Figure 7:
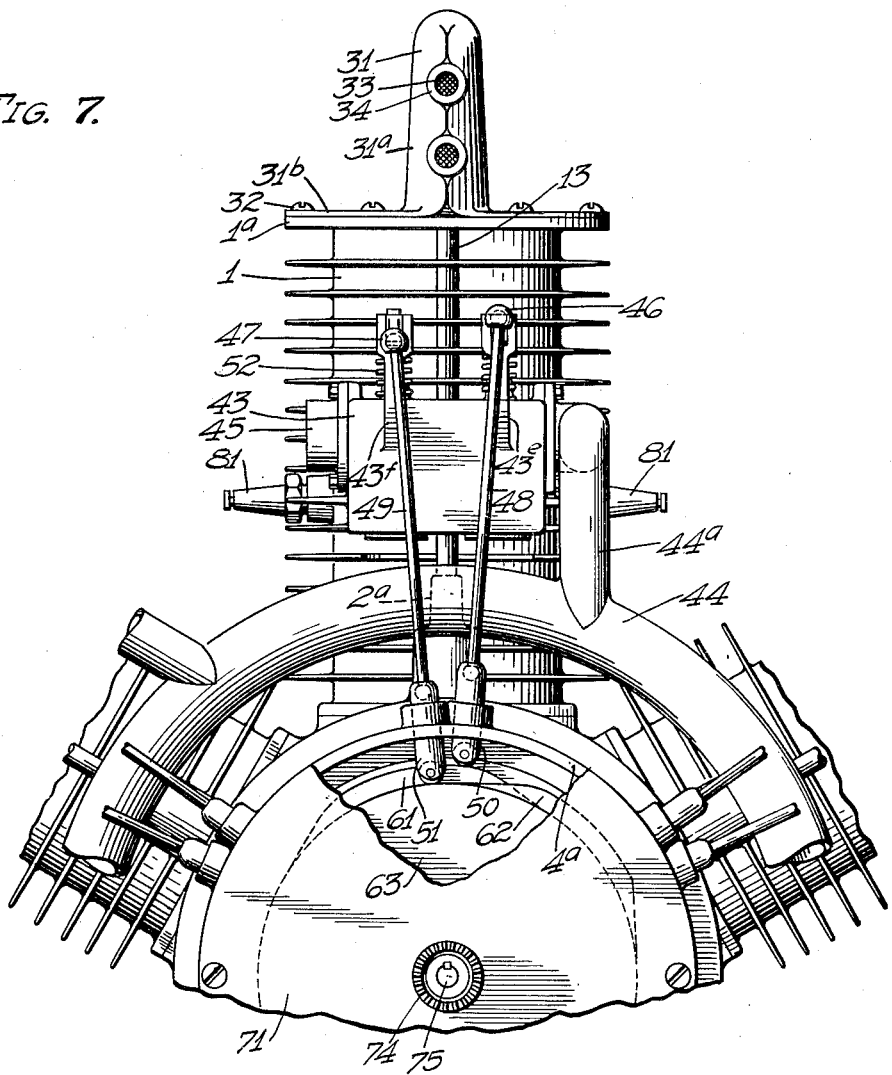
Figure 8:
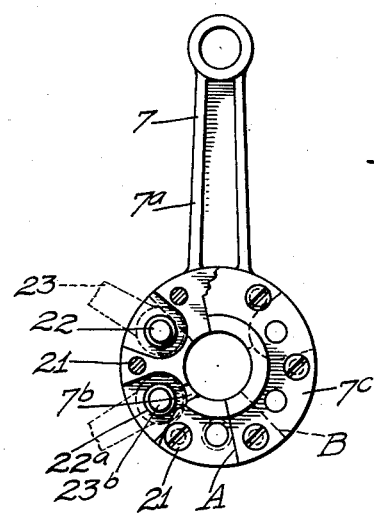
Figure 9:
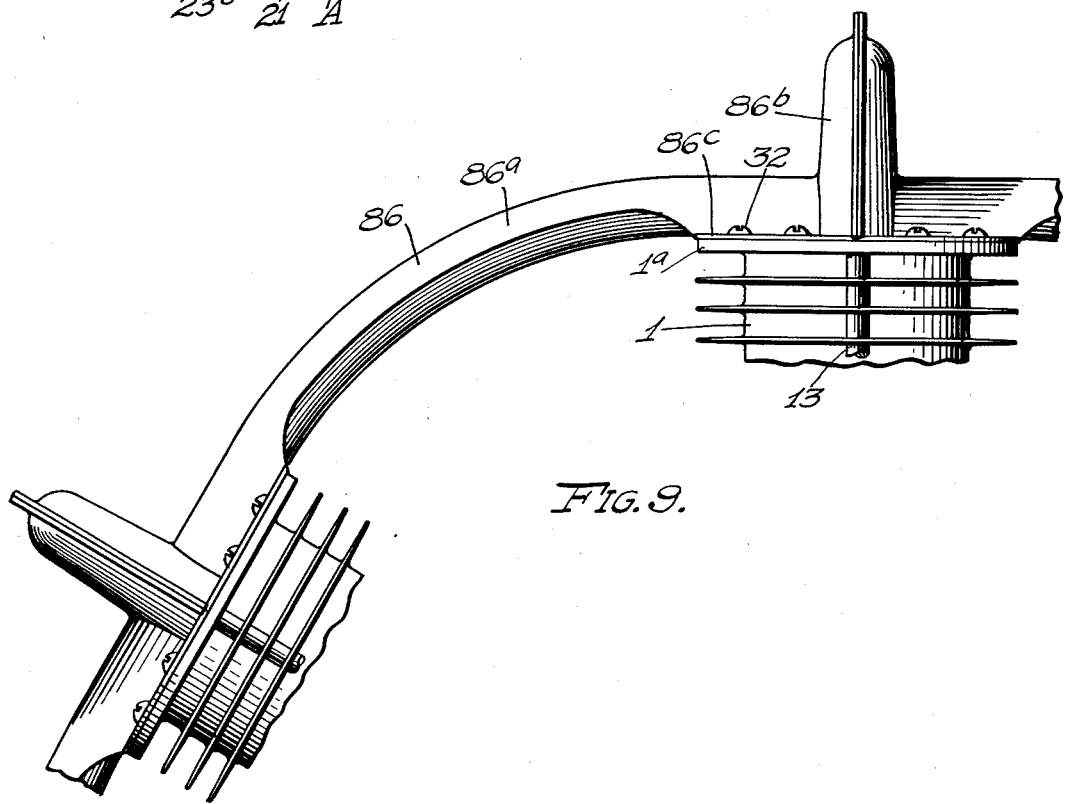

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view of a fragmentary portion of my engine in one form of construction, the section being taken on the line 1—1 of Fig. 4 with the portion through the valve being taken on the line 1—1 of Fig. 6; Fig. 2 is a fragmentary sectional view taken at 2—2 of Fig. 1; Fig. 3 is a sectional view thereof taken at 3—3 of Fig. 1; Fig. 4 is a fragmentary sectional elevational view taken at 4—4 of Fig. 1 on the plane passing through the axes of all of the cylinders, certain parts and portion being shown in elevation to facilitate the illustration; Fig. 5 is an outer end view of one of the cylinders; Fig. 6 is a transverse sectional view thereof taken through 6—6 of Fig. 1 showing the valve and port construction; Fig. 7 is a fragmentary elevational view of my engine taken from the rear side thereof; Fig. 8 is a fragmentary view of the main mother connecting rod showing portions thereof broken away to facilitate the illustration; and Fig. 9 is a fragmentary elevational view of two cylinders showing a modified form of construction of the outer ends thereof.

Like characters of reference refer to similar parts and portions throughout the views of the drawings:

The illustrations in the accompanying drawings are of a radial type air craft engine, and my description will be confined to the illustrations, but it will be noted that several features thereon are applicable to other types of engines.

The cylinders, designated 1, are mounted radially around a crank case 2 which is provided at its front and rear sides with axially arranged and bearing supporting crank case ends or covers 3 and 4, respectively. The number of cylinders 1 may be either of an even or odd number, the firing order being in my present engine of less moment than in the usual type of radial air craft engine.

The cylinders 1 are of a construction similar to the ordinary air cooled engine except that in this instance they are preferably slightly longer and also in this instance there is no outer head, the valve ports, chambers and valves being arranged at the sides of the cylinders.

In each of the cylinders is mounted a pair of pistons, namely an inner piston 5 and an outer piston 6, the latter taking the place of the usual head at the outer end of the ordinary engine. The inner piston 5 is connected by a connecting rod 7 to a throw portion 8a of the crank shaft 8 which is revolubly mounted in the crank case and supported by the case ends or covers 3 and 4 on suitable bearings 9.

Although I have shown only one series of cylinders and all arranged in the same plane, I have provided a multiple throw crank shaft, there being provided for purposes to be hereinafter described other throw or bearing portions 8b at the opposite sides of the throw portion 8a, the portions 8b being also arranged at the diametrically opposite sides of the axis of the crank shaft from the throw portion 8a. This crank shaft, for convenience and rigidity of construction, is preferably made of one piece and the connecting rods are connected thereto in a special manner.

The outer pistons 6 are provided with axial shanks or fixed piston rods 11 which extend radially outwardly and preferably beyond the outer ends of the cylinders. To the outer end of each piston rod 11 is secured the middle portion of a bridge member or yoke 12 which is preferably positioned beyond the outer end of the corresponding cylinder and extends with its ends beyond the operating cylinder. At diametrically opposite sides of the cylinder is reciprocally mounted a pair of rods 13 which are guided near their respective outer and inner ends by a flange 1a at the outer end of the cylinder and tubular guide portions 2a mounted on and extending through the outer wall of the crank case and which are radially arranged with respect to the axis of the crank case. The outer ends of each pair of rods 13 are secured in any suitable manner to the ends of the yoke 12. The inner ends of the rods 13 are here enlarged, as designated by 13a, the enlarged portions being guided against lateral movement by the walls of the enlarged bores 2b of the guide portions 2a. The enlarged portions 13a are slotted for receiving the outer ends of connecting rods 14 which are pivotally connected to the enlarged portions 13a. The portions 2c of the tubular guide portions 2a extending within the crank case are slotted at their opposite sides, as indicated by 2d in Fig. 1, so as to permit free movement of the connecting rods 14 as the same are moved from side to side by the crank shaft.

It will be here noted that the yoke 12 is adjustably secured to the outer end of the piston rod 11 by nuts 15 and 16 at the opposite sides of the yoke so as to adjust the outer piston 6 inwardly or outwardly with respect to the inner piston so as to change the space between the pistons for increasing or decreasing the compression of the fuel gases.

The connecting rods 7 and 14 hereinbefore mentioned will be hereinafter designated, respectively, as main mother rod and secondary mother rods. Both of these mother rods are of substantially identical construction except that the latter are considerably smaller than the former. Only the mother rod 7 will therefore be described. The mother rod 7 consists primarily of a main connecting rod member 7a, a cap 7b and semi-circular plates 7c positioned at the opposite sides of the main connecting rod member and cap. The main connecting rod member 7a and the cap 7b are joined around and on a diametric line through the bearing portion of the throw 8a. The joined portions of the cap and main connecting rod member are here shown on a line extending on an angle to a line transverse to the longitudinal axis of the main connecting rod member. The semi-circular plates 7c are arranged in matched pairs at the opposite sides of the main connecting rod member and are secured thereto by a plurality of screws or bolts 21 in such a manner that the plates 7c hold the cap in fixed relation relative to the main connecting rod member 7a. The line of separation of the joined pairs of semi-circular plates are substantially at right angles to the line of separation between the cap and the main connecting rod members; and the lines of separation of each pair of such plates at the opposite sides of the main connecting rod member being also preferably staggered or shifted relative to each other, as indicated by A and B, for purposes of strength.

Between the plates at the opposite sides of the connecting rods are positioned bearing pins 22 which consist of large bearing portions 22a intermediate their ends and reduced portions 22b at their ends, the former portions being positioned between the plates and the latter extending into holes in the plates. The shoulders formed between the reduced and large portions bear against the inner sides of said plates. On the large portions of said bearing pins are reciprocally mounted the inner ends of other connecting rods 23 which are connected at their outer ends to the inner pistons of the other cylinders.

The secondary mother rods 14 are similarly provided with bearing pins 26 upon which are mounted the inner ends of other secondary connecting rods 27 which are pivotally connected at their outer ends to the inner ends of the operating rods 13 of the other cylinders, as shown best in Figs. 1 and 4.

At the outer end of each of the cylinders is mounted an enclosure 31 which may be of very light construction. This enclosure, shown best in Figs. 1, 4 and 5, consists of a narrow streamlined outwardly extended portion 31a and a securing plate portion 31b which is secured at its peripheral portion by screws 32 to the flange 1a of the cylinder. As the outer piston of each cylinder is forced outwardly, the yoke 12 is also forced outwardly into the portion 31a of the enclosure or cap. In order to reduce the resistance of the outer piston in its inward and outward movement to a minimum, I have provided breather openings 31c at the rear edge of the closure, said openings being formed in backwardly extending tubular portions. Over the openings are placed screens 33 which may be held in position by securing rings 34.

The intake and exhaust valves 41 and 42, respectively, for each cylinder are enclosed in a valve housing 43 located at the rear side of the cylinder. At the inner end of the valve housing are provided intake and exhaust chambers 43a and 43b into which extend the head ends of the intake and exhaust valves, respectively. The stems of the valves extend outwardly toward the outer ends of the cylinders through other intake and exhaust chambers 43c and 43d, the former being connected to branch conductors 44a of an intake manifold 44 which in this instance is shown annular in construction and extends around the crank case at the rear side of the cylinders. The exhaust chamber 43d may be connected to an exhaust manifold or merely to a short exhaust conductor 45 secured to the side of the valve housing, as shown. At the radially outer sides of the valve housing and around the stems of the valves are positioned compression springs 52 which urge the valve heads against their respective seats within the chambers 43a and 43b At the rear sides of the valve housing, are provided outwardly extending brackets 43e and 43f at the outer ends of which are pivotally mounted rocker arms 46 and 47, respectively, for opening the intake and exhaust valves. These rocker arms are actuated by push rods 48 and 49 which are arranged radially with respect to the axis of the crank shaft and which are pivotally connected at their outer and inner ends, respectively, by ball and socket joints to the rocker arms and push rod guides 50 and 51 which are also radially arranged with respect to the axis of the crank shaft and reciprocally mounted in guide portions in a cylindrical wall 4a extending backwardly from the crank case end or cap 4.

All of the valves of the several cylinders are controlled preferably by a pair of cams 61 and 62 provided on the exterior of a cam bearing drum 63 which is positioned backwardly from the crank case end member 4 and inwardly from the backwardly extending shell 4a, said drum being preferably mounted on the member 4 and on the backwardly extended end of the crank shaft, as shown best in Fig. 1. The cams are longitudinally spaced apart with respect to the axis of the crank shaft and each of the cams actuate one of the push rod guides as the cams are rotated as shown best in Fig. 7.

The cam bearing drum 63 is provided at its interior with an internal gear 64 which is driven by one or more idler gears 65 mounted on the member 4. The idler gear is driven by a gear 66 mounted directly on the crank shaft, all of the gears being enclosed in the drum 63.

The rear end of the crank case end member 4 is enclosed by a plate 71 upon which may be supported a pair of magnetos 72. As here shown, these magnetos are provided with bevel gears 73 which may be driven at half of engine speed by a smaller bevel gear 74 secured to a shaft 75 extending through the plate 71 and secured to the rear end of the crank shaft in any suitable manner.

The fuel gases are ingnited by suitable spark plugs 81 extending through the wall of each cylinder intermediate the ends thereof which spark plugs are connected to the magneto. It will be here noted that the spark plugs are arranged at the sides of the cylinders so that the same are readily kept cool by a constant flow of passing air from the front side of the engine.

In Fig. 9 of the drawings, I have shown a slightly modified form of construction of the outer ends of the cylinders. Instead of providing breather holes in the yoke enclosure, I have interconnected the various enclosures so as to reduce to a minimum the possibility of dirt and grit being drawn into the cylinders. The enclosure shown in Fig. 9 consists of a multiplicity of segments 86 each comprising an intermediate streamlined conduit portion 86a which is connected at its ends to enclosure portions 86b which are shaped similar to one-half of the previously described closures 31, but divided on the longitudinal median line. The enclosure portions 86b of adjacently positioned members 86 form complete enclosures for the yoke, the portions 86b being secured together in any suitable manner. The ends of the members 86 are also provided with plates or securing portions 86c which are secured to the outer ends of the cylinders by screws 32.

Though I have shown and described a particular construction, combination and arrangement of parts and portions, and a certain modification thereof, and a specific embodiment of the various features of my invention in a radial aircraft engine, I do not wish to be limited to this particular construction, combination and arrangement, nor to the modification, nor to the specific embodiment, but desire to include in the scope of my invention, the construction, combination and arrangement susbtantially as set forth in the appended claims.

Having thus described my invention, what I claim as new and desire to secure by Letters Patent is:

1. In an internal combustion engine, a cylinder, a multiple throw crank shaft revolubly mounted transversely to and at one end of the cylinder, a pair of oppositely reciprocating pistons within the cylinder, a connecting rod connecting one of the pistons directly to one of the throws of the crank shaft, a yoke secured to the other piston and positioned at the outer end of the cylinder, means at the opposite sides of the cylinder operatively connecting the opposite ends of the yoke to other throws of the crank shaft, and an enclosure for the yoke at the outer end of the cylinder.

2. In an internal combustion engine, a cylinder, a multiple throw crank shaft revolubly mounted transversely to and at one end of the cylinder, a pair of oppositely reciprocating pistons within the cylinder, a connecting rod connecting one of the pistons directly to one of the throws of the crank shaft, a yoke secured to the other piston and positioned at the outer end of the cylinder and extending beyond the opposite sides thereof in a direction parallel to the axis of the crank shaft, rods reciprocally mounted at the opposite and outer sides of the cylinder and secured at their outer ends to the opposite ends of the yoke, other connecting rods mounted on other throws of the crank shaft and connected at their outer ends to the inner ends of the rods, and a closure for the yoke and outer ends of the rods at the outer end of the cylinder.

3. In an internal combustion engine, a cylinder, a multiple throw crank shaft revolubly mounted transversely to and at one end of the cylinder, a pair of oppositely reciprocating pistons within the cylinder, a connecting rod connecting one of the pistons directly to one of the throws of the crank shaft, a yoke secured to the other piston and positioned at the outer end of the cylinder, means at the opposite sides of the cylinder operatively connecting the opposite ends of the yoke to other throws of the crank shaft, and an enclosure for the yoke at the outer end of the cylinder, said enclosure being streamlined from front to rear and provided with breather holes at its rear portion.

4. In a radial motor, a central crank case, cylinders radiating outwardly therefrom and located in a unitary plane, pairs of oppositely reciprocating pistons mounted in each of the cylinders, a multiple throw crank shaft mounted in the crank case, a mother connecting rod connecting the inner piston of one of the cylinders to one of the throws of the crank shaft, other connecting rods connecting the inner pistons of the other cylinders with the mother connecting rod, yokes secured to the outer pistons of each of the cylinders and extending to the opposite sides of said cylinders parallel to the axis of the crank shaft, said crank shaft having a pair of opposite throws at the opposite sides of the first mentioned throw, a pair of secondary mother connecting rods operatively connecting the opposite throws of the connecting rods to one of said yokes, and other secondary connecting rods operatively connecting said secondary mother connecting rods to the other yokes.

5. In a radial motor, a central crank case, cylinders radiating outwardly therefrom and located in a unitary plane, pairs of oppositely reciprocating pistons mounted in each of the cylinders, a multiple throw crank shaft mounted in the crank case, a mother connecting rod connecting the inner piston of one of the cylinders to one of the throws of the crank shaft, other connecting rods connecting the inner pistons of the other cylinders with the mother connecting rod, yokes secured to the outer pistons of each of the cylinders and extending to the opposite sides of said cylinders parallel to the axis of the crank shaft, said crank shaft having a pair of opposite throws at the opposite sides of the first mentioned throw, pairs of rods reciprocally mounted at the opposite sides of each of the cylinders and connected at their outer ends to the opposite ends of the yokes, the inner ends of said rods extending into said crank case, secondary mother connecting rods mounted on the opposite throws of the crank shaft and pivotally connected to the inner ends of one pair of said rods, and other secondary connecting rods connecting said secondary mother connecting rods to the other pairs of said reciprocating rods.

6. In a radial motor, a central crank case, cylinders radiating outwardly therefrom and located in a unitary plane, pairs of oppositely reciprocating pistons mounted in each of the cylinders, a multiple throw crank shaft mounted in the crank case, a mother connecting rod connecting the inner piston of one of the cylinders to one of the throws of the crank shaft, other connecting rods connecting the inner pistons of the other cylinders with the mother connecting rod, yokes secured to the outer pistons of each of the cylinders and extending to the opposite sides of said cylinders parallel to the axis of the crank shaft, said crank shaft having a pair of opposite throws at the opposite sides of the first mentioned throw, pairs of rods reciprocally mounted at the opposite sides of each of the cylinders and connected at their outer ends to the opposite ends of the yokes, the inner ends of said rods extending into said crank case, secondary mother connecting rods mounted on the opposite throws of the crank shaft and pivotally connected to the inner ends of one pair of said rods, and other secondary connecting rods connecting said secondary mother connecting rods to the other pairs of said reciprocating rods, said crank case having guides radiating outwardly with respect to the axis of the crank shaft and aligned with said reciprocating rods for guiding the inner ends of said rods at their pivotal connection with said secondary connecting rods.

7. In an engine of the class described, a crank case, cylinders mounted thereon and extending therefrom, a crank shaft revolubly mounted in the crank case, pairs of oppositely reciprocating pistons mounted in each cylinder, connecting rods directly connecting the inner pistons to said crank shaft, piston rods secured to the outer pistons of each cylinder and extending toward the outer ends of the cylinders, yokes secured to the outer ends of the piston rods, other connecting rods operatively connecting the outer ends of the yokes to said crank shaft, readily removable caps for the outer ends of the cylinders, and means for adjusting the positions of the outer pistons relative to the inner pistons of each cylinder when the caps are removed.

In testimony whereof, I have hereunto set my hand at Los Angeles, California, this 27th day of November, 1928.

LEE M. BOWMAN.